INVENTORS.
Margaret L. Esmay and
Paul O. Esmay
BY Louis Sheldon
Attorney

June 10, 1958 M. L. ESMAY ET AL 2,837,866
TERRACED GARDEN STRUCTURE
Filed Aug. 14, 1953 3 Sheets-Sheet 2
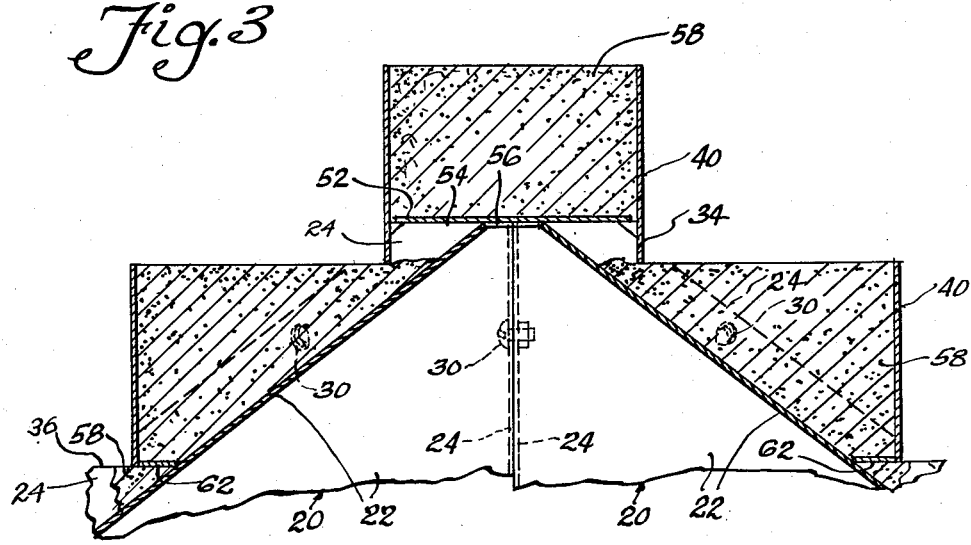
Fig. 3
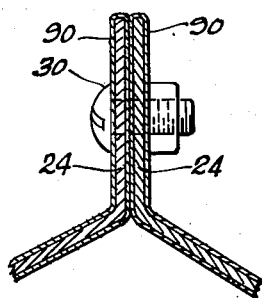
Fig. 4
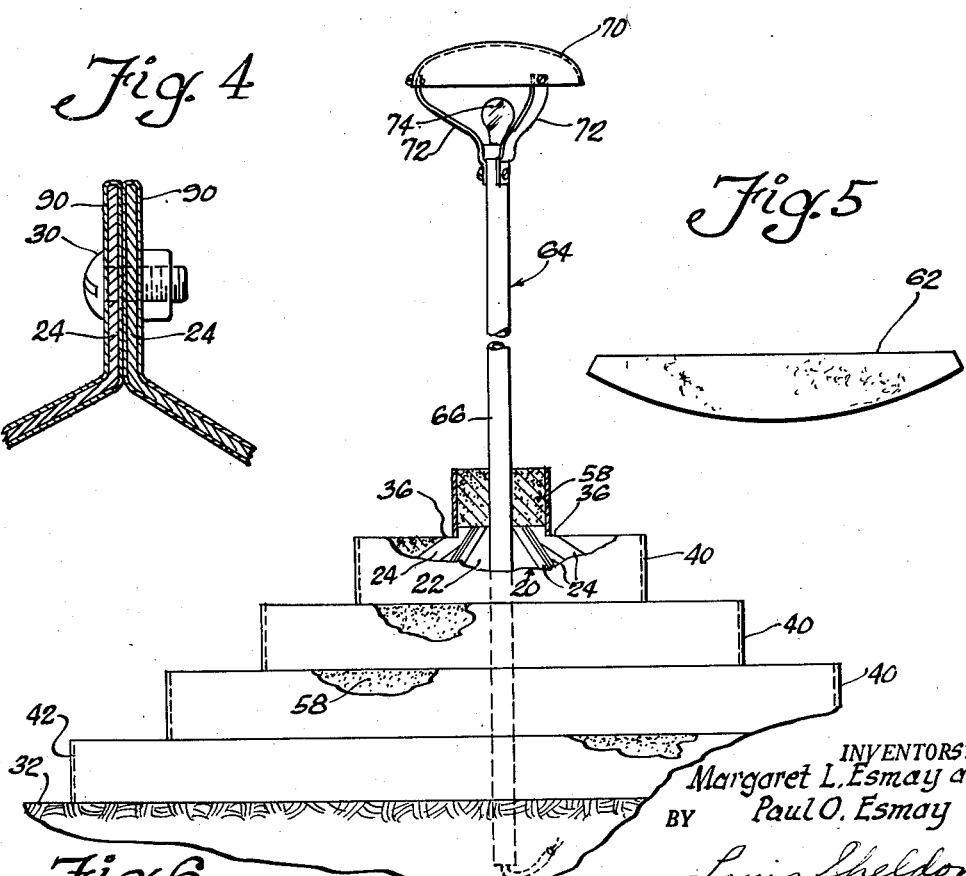
Fig. 5
Fig. 6
INVENTORS:
Margaret L. Esmay and
BY  Paul O. Esmay
Louis Sheldon
Attorney June 10, 1958 M. L. ESMAY ET AL 2,837,866
TERRACED GARDEN STRUCTURE
Filed Aug. 14, 1953 3 Sheets-Sheet 3
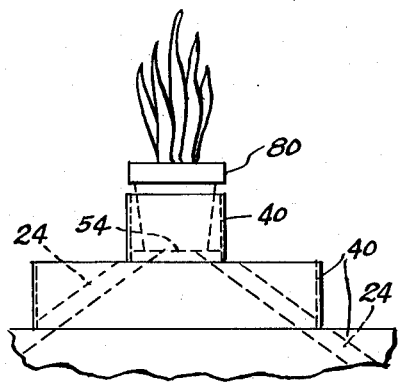
Fig. 7
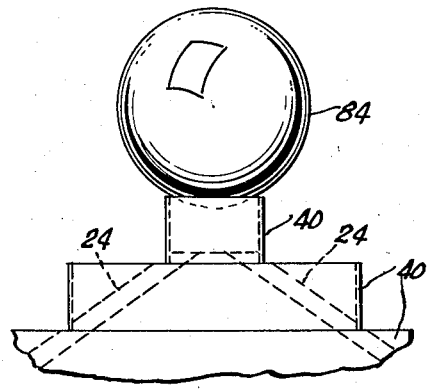
Fig. 8
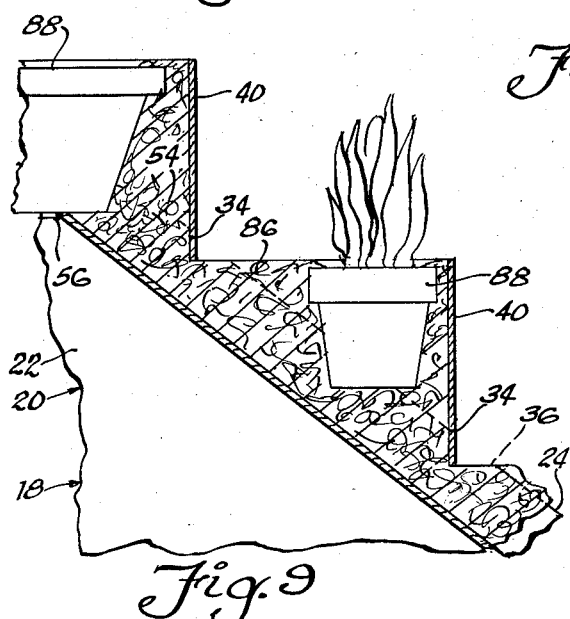
Fig. 9
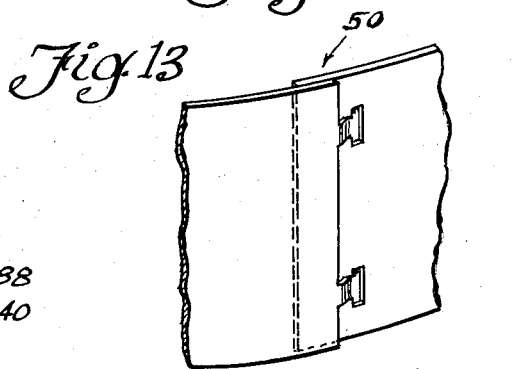
Fig. 13 / Fig. 10
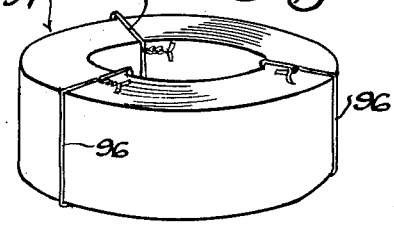
Fig. 12
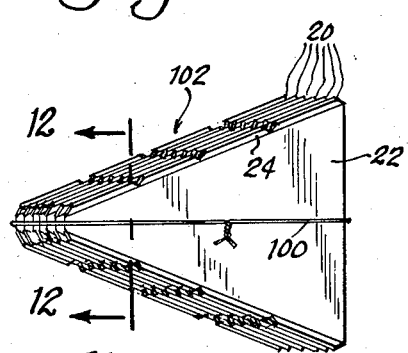
Fig. 11
INVENTORS:
Margaret L. Esmay and
Paul O. Esmay
BY
Louis Sheldon
Attorney

2,837,866

TERRACED GARDEN STRUCTURE

Margaret L. Esmay and Paul O. Esmay,
Three Rivers, Mich.

Application August 14, 1953, Serial No. 374,244

8 Claims. (Cl. 47—33)

This is a continuation-in-part of our co-pending application Serial No. 53,746, filed October 9, 1948, now Patent Number 2,651,143, entitled "Terraced Garden."

An object of the present invention is to provide a terraced garden structure requiring substantially less soil and irrigation without diminution in the number of plants that may be grown in the garden.

A further object is to provide a simple, inexpensive, and easily assembled support for the soil.

An additional object is to provide a terraced garden structure embodying soil-confining bands in the form of strips of the same sheet metal stock adapted to be shipped compactly in a single roll and to be readily individually connected by the consumer into rings or bands of successively reduced diameter for use in the formation of a terraced cone-like garden.

It is also an object to provide an inexpensive terraced garden which may be completed by the consumer with a minimum of time and effort.

It is another object to provide a terraced garden in which the soil-confining bands are supported independently of the soil.

It is a further object to provide a terraced garden supporting structure which may be readily set up, complete with or without soil, for display purposes.

Another object is to provide a terraced garden structure in which the soil of all of the terraces may be substantially uniformly irrigated.

A further object is to provide a terraced garden structure affording additional planting area.

An additional object is to provide a terraced garden structure including means whereby the plants may be illuminated.

It is also an object to provide a terraced garden structure adapted to support a flower pot or ornament or other device at its apex.

Another object is to provide a knockdown terraced garden structure which when dismantled may occupy a relatively small space for shipment and storage.

Further objects and advantages of the invention will appear as the description proceeds.

The invention will be better understood upon reference to the following description and accompanying drawings, in which.

Figure 1:
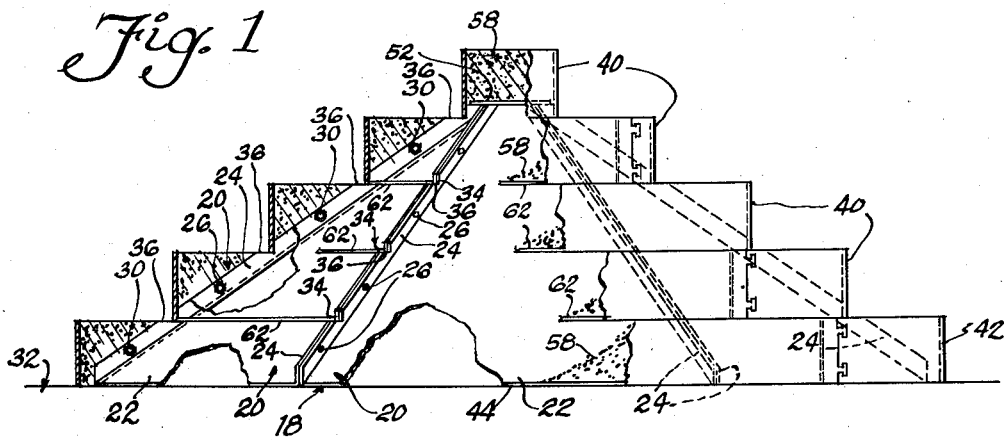
Fig. 1 is an elevational view of an illustrative embodiment of a terraced garden structure embodying features of the invention.
Figure 2:
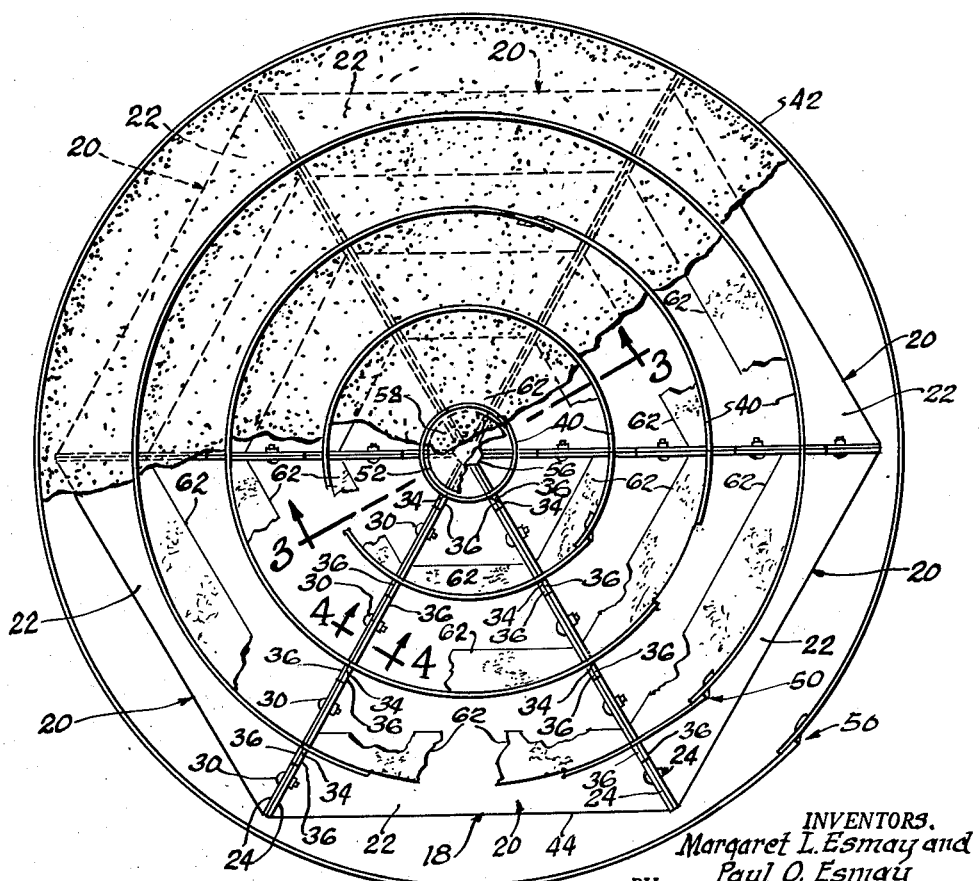
Fig. 2 is a top plan view of the same.

Figs. 3 and 4 are enlarged fragmentary sectional views taken as indicated by the lines 3—3 and 4—4 in Fig. 2.

Fig. 5 is a plan view of one of the liquid-impervious sheets underlying the soil of certain of the terraces.

Fig. 6 is a view partly in section and partly in elevation showing a terraced garden and illuminating means therefor.

Figs. 7 and 8 are fragmentary elevational views showing respectively a flower pot and a reflective ball supported at the top of the garden.

Fig. 9 is a fragmentary sectional view showing a simulated terraced garden including flower pots, only the soil and plants of which will be seen, for use as a display in a dealer's shop or the like.

Fig. 10 is a perspective view of a compact shipping and storage package in the form of a coil of the several soil-confining bands of the terraced garden.

Fig. 11 is an elevational view of a compact shipping and storage package of nested support sections.

Fig. 12 is an enlarged sectional view taken as indicated by the line 12—12 in Fig. 11.

Fig. 13 shows how the band ends may be connected.

Referring now more particularly to the drawings, there is shown at 18 a support formed of a plurality of identical preferably isosceles trapezoidal sheet metal plates 20 having, at the sides of the webs 22 thereof, flanges 24 formed with bolt holes 26, the plates being adapted to be arranged together in the general shape of a pyramid and bolted together as at 30 to provide a unitary structure adapted to rest on the ground 32 or other preferably substantially horizontal support. The flanges 24 are preferably formed with notches 34 affording ledges 36 at different levels of the support.

The terraced garden structure also includes soil-confining bands 40 of different diameters adapted to rest on the respective ledges 36, said bands thus being of successively reduced diameters and being held substantially stationary by and in assembly with the support 18. An additional and larger band 42 is employed to surround the base 44 of the support 18 and rest on the ground 32 to provide an additional terrace.

In accordance with one form of the invention, after the support 18 is formed as above noted it is placed on the ground 32, the ends 48 of the several band strips are interlocked as indicated at 50—a task easily performed by the consumer without the use of any tool—and the band 42 placed on the ground about the support base 44 and the remaining bands 40 placed on the respective ledges 36; a baffle lid 52 is placed on the top 54 of the support so as to cover the hole 56; the spaces between the lower bands and the support are filled with soil 58, and the top band is filled with soil, tarpaper or other suitable liquid-impervious material, baffle strips or sheets 62 being preferably placed so as to substantially completely underlie the soil of the individual lower terraces and thus substantially prevent or minimize seepage downward beyond the same and prevent or minimize inner peripheral erosion of the soil where it contacts the support. Water or other irrigating liquid sprinkled on the several terraces will thus be retained in the several terraces receiving the same.

In accordance with another form of the invention, an electric lamp unit 64 is employed to illuminate the plants on the terraces. Such a unit may comprise a tubular post or standard 66 lowered through the top hole 56 of the support 18 and imbedded in the ground 32 as indicated at 68, a reflector 70 supported by preferably three spaced rods 72 over the top of the post, and a lamp 74 mounted in a socket in the top of the post, the top of the support substantially engaging the post to stabilize it in substantially vertical position. The rods 72 are preferably detachably secured as at 76.

In another form of the invention (Fig. 7) the lamp unit may be replaced by a flower pot 80 resting on the top 54 of the support 18, the pot being confined laterally by the top band 40.

In a further form of the invention a highly reflective metal or other ball 84 may be supported by the top band 40 for ornamental purposes and also to scare birds away from the plants.

For display purposes in a store, for example, where it is desired to avoid use of soil, the support 18 and bottom band 42 may be placed on the floor, and the other bands 40 placed on the support as above, rock wool, glass wool, excelsior, vermiculite, spagma moss or the like material 86 is placed within the several bands, and flower pots 88 are imbedded in such material to simulate the terraced garden as it would appear when used by the consumer.

The various parts are preferably of rust-proof or rust-proofed material and accordingly the bands 40 and 42 may be of sheet aluminum, the bolts and nuts cadmium plated, and the flanged plates may be made of sheet steel dipped in asphalt 90 (Fig. 4) or the like which has the additional function of gasketing the bolted flanges 24 to prevent leakage of irrigating liquid through the support 18, the asphalt or the like being dry but yieldable when received by the consumer.

The several band strips are of aluminum or other preferably flexible sheet material so as to be capable of being rolled into a compact package of small diameter and of a height equal to the width of the strips shown at 94, held as by wrapping wires 96, to occupy minimum space for shipment or storage (Fig. 10). The shape of the plates 20 lends itself to the nesting of the plates together to occupy a minimum of space for shipment or storage, and they may be tied together as at 100 into a compact package 102 (Fig. 11). The rods 70 being detachably mounted, the lamp unit 64 may be knocked down for the same purpose.

The connected ends of each band may be supplied with means for preventing leakage of irrigating liquid, but in practice this is unnecessary since the amount of leakage past the connections will be too insignificant to be of any practical importance.

Various modifications may suggest themselves to those skilled in the art without departing from the spirit of our invention. Hence we do not wish to be restricted to the specific forms shown or uses mentioned, except to the extent indicated in the appended claims, which are to be interpreted as broadly as the state of the art will permit.

We claim:

1. In a terraced garden in which soil is adapted to be confined within endless bands, a support for the bands, said support converging in girth from bottom to top so as to support endless bands of progressively reduced girth upward, said support comprising a plurality of sections extending throughout the height of and converging from bottom to top of said support, each section having side flanges extending outward relative to said support, the flanges of each section facing and being secured to the neighboring flanges to provide a unitary structure, said flanges having ledges at different elevations therealong on which the several bands are adapted to rest.

2. In a terraced garden in which soil is adapted to be confined within endless bands, a support for the bands, said support converging in girth from bottom to top so as to support endless bands of progressively reduced girth upward, said support comprising a plurality of plate sections extending throughout the height of and converging from bottom to top of said support, each section having side flanges extending outward relative to said support, the flanges of each section facing and being secured to the neighboring flanges to provide a unitary structure, said flanges having ledges at different elevations therealong on which the several bands are adapted to rest, said sections being identical and of rust-proof material, each section, between the flanges thereof, being isosceles, whereby said sections, when dismantled, may be compactly nested together for shipment or storage.

3. In a terraced garden in which soil is adapted to be confined within endless bands, a support for the bands, said support converging in girth from bottom to top so as to support endless bands of progressively reduced girth upward, said support comprising a plurality of plate sections extending throughout the height of and converging from bottom to top of said support, each section having side flanges extending outward relative to said support, the flanges of each section facing and being secured to the neighboring flanges to provide a unitary structure, said flanges having ledges at different elevations therealong on which the several bands are adapted to rest, said sections being identical and of rust-proof material, each section, between the flanges thereof, being isosceles, whereby said sections, when dismantled, may be compactly nested together for shipment or storage, endless rust-proof bands supported on and extending upward from the several ledges, said bands being formed of flexible sheet metal strips of different lengths formed at their ends with means whereby the ends may be detachably interlocked by the consumer to provide a plurality of separate endless bands for confining the soil of the several terraces, said strips, when dismantled, being adapted to be tightly coiled within one another in the form of a compact roll for shipment or storage.

4. In a terraced garden in which soil is adapted to be confined within endless bands, a support for the bands, said support converging in girth from bottom to top so as to support endless bands of progressively reduced girth upward, said support comprising a plurality of plate sections extending throughout the height of and converging from bottom to top of said support, each section having side flanges extending outward relative to said support, the flanges of each section facing and being secured to the neighboring flanges to provide a unitary structure, said flanges having ledges at different elevations therealong on which the several bands are adapted to rest, the tops of said flanges being at the top of said support and lying in a substantially horizontal plane when said support rests on substantially horizontal ground, whereby to provide a rest for a flower pot.

5. In a terraced garden, a plurality of liquid-impervious substantially isosceles trapezoidal channel sections connected in flange-to-flange relation and affording a hollow support converging from bottom to top, said flanges projecting away from the interior of said support and having ledges at different levels thereof for supporting endless soil-confining bands of progressively reduced girth upward.

6. A terraced garden comprising a support structure comprising a series of juxtaposed sections of liquid-impervious material which together form an upstanding, tapered support shell which has a progressively decreasing girth in an upward direction, said separate sections having outwardly extending, confronting flanges at the sides thereof which flanges are respectively provided with corresponding support ledges at a number of different elevations thereon, a plurality of bands of liquid-impervious material respectively resting upon said flange ledges at different levels, said bands encompassing the support and being of progressively decreasing girth extending in an upward direction thereby forming with said support a terraced garden structure whereby each level thereof may support a separate body of soil and can retain its own supply of water, gasket means between the confronting flanges of said support sections, and means for clamping together said confronting flanges to compress the gasket means and render the joints of the sections water-proof.

7. In a terraced garden in which soil is adapted to be confined within endless bands, a support for the bands, said support converging in girth from bottom to top so as to support endless bands of progressively reduced girth upward, said support comprising a plurality of substantially liquid-impervious plate sections extending throughout the height of and converging from the bottom to the top of said support, said plate sections having ledges at different elevations therealong on which the several bands are adapted to rest, said sections being identical and of rust-proof material and, when dismantled, being adapted to be compactly nestled together for shipment or storage.

8. A terraced garden comprising a soil support structure adapted to rest on the ground and including bottom wall means continuously uniformly sloping upwardly and inwardly from the margin of the structure, a plurality of soil-confining walls carried by and extending upwardly from said sloping bottom wall means at different respective levels thereon to define respective open-top soil-receiving compartments at said different levels of progressively diminishing size, and soil in said respective compartments confined by said sloping bottom wall means and upstanding walls, said sloping bottom wall means minimizing the amount of soil needed in the structure.

References Cited in the file of this patent

UNITED STATES PATENTS

| | | |
|---|---|---|
| 185,468 | Archer | Dec. 19, 1876 |
| 197,406 | Reinecke | Nov. 20, 1877 |
| 425,890 | Landis | Apr. 15, 1890 |
| 440,141 | Dearborn | Nov. 11, 1890 |
| 2,436,770 | Hill et al. | Feb. 24, 1948 |
| 2,651,143 | Esmay et al. | Sept. 8, 1953 |

FOREIGN PATENTS

| | | |
|---|---|---|
| 317,585 | Great Britain | Aug. 22, 1929 |
| 592,621 | Germany | Feb. 12, 1934 |